US007969921B2

(12) United States Patent
Singh et al.

(10) Patent No.: US 7,969,921 B2
(45) Date of Patent: Jun. 28, 2011

(54) METHOD AND SYSTEM FOR DATA PACKET COMMUNICATION IN WIRELESS COMMUNICATION SYSTEMS

(75) Inventors: Harkirat Singh, Santa Clara, CA (US); Chiu Ngo, San Francisco, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 574 days.

(21) Appl. No.: 11/897,063

(22) Filed: Aug. 29, 2007

(65) Prior Publication Data

US 2009/0059949 A1 Mar. 5, 2009

(51) Int. Cl.
*H04B 7/005* (2006.01)
(52) U.S. Cl. .................. 370/278; 370/521; 370/231
(58) Field of Classification Search .................. 370/278, 370/521, 231
See application file for complete search history.

(56) References Cited

U.S. PATENT DOCUMENTS

| | | | |
|---|---|---|---|
| 7,072,628 B2 | 7/2006 | Agashe et al. | |
| 7,123,627 B2* | 10/2006 | Kowalski | 370/468 |
| 7,315,898 B2 | 1/2008 | Kohno | |
| 7,463,892 B2* | 12/2008 | Eiger et al. | 455/452.2 |
| 7,580,672 B2 | 8/2009 | Rowitch | |
| 7,613,423 B2 | 11/2009 | Ngo et al. | |
| 7,684,329 B2 | 3/2010 | Mohanty et al. | |
| 2004/0266339 A1 | 12/2004 | Larsson | |
| 2007/0019591 A1* | 1/2007 | Chou et al. | 370/337 |
| 2007/0104162 A1* | 5/2007 | Kneckt et al. | 370/338 |
| 2007/0238482 A1* | 10/2007 | Rayzman et al. | 455/552.1 |
| 2007/0266292 A1* | 11/2007 | Korndewal et al. | 714/749 |
| 2008/0043638 A1* | 2/2008 | Ribiere et al. | 370/254 |
| 2008/0075050 A1* | 3/2008 | Huang et al. | 370/338 |
| 2008/0273554 A1 | 11/2008 | Shao et al. | |

OTHER PUBLICATIONS

LAN/MAN Committee of the IEEE Computer Society, "IEEE Standard for Information technology—Telecommunications and information exchange between systems—Local and metropolitan area networks—Specific requirements, Part 11: Wireless LAN Medium Access Control (MAC) and Physical Layer (PHY) specifications: Amendment: Medium Access Control (MAC) Quality of Service (QoS) Enhancements," Amendment to ANSI/IEEE Std 802.11™— 1999, Jan. 2005, pp. 1-198, The Institute of Electrical and Electronics Engineers, Inc., New York, NY.

(Continued)

*Primary Examiner* — Jason E. Mattis
*Assistant Examiner* — Kibrom T Hailu
(74) *Attorney, Agent, or Firm* — Kenneth L. Sherman, Esq.; Michael Zarrabian, Esq.; Myers Andras Sherman & Zarrabian LLP

(57) ABSTRACT

The present invention provides a method and system for data packet communication in wireless communication systems. One embodiment involves determining if one or more data blocks pending transmission in a current transmission opportunity period over the channel will expire before the start of another transmission opportunity period, and if a data block will expire before the start of another transmission opportunity period, then extending the current transmission opportunity period by an extension period for transmitting the expiring data block during the extension period. One or more expiring packets are transmitted during the extension period on a best-effort basis.

18 Claims, 6 Drawing Sheets

OTHER PUBLICATIONS

"IEEE P802.11n/D1.0, Draft Amendment to Standard [FOR] Information Technology—Telecommunications and information exchange between systems—Local and Metropolitan networks-Specific requirements—Part 11: Wireless LAN Medium Access Control (MAC) and Physical Layer (PHY) specifications: Enhancements for Higher Throughput." IEEE, Mar. 2006, pp. 1-335, New York, NY, United States.

International Standard ISO/IEC 13818-1, "Information technology—Generic coding of moving pictures and associated audio information," Dec. 1, 2000, pp. 1-174, United States.

IEEE Wireless LAN Edition (2003), "A compilation based on IEEE Std 802.11-1999 (R2003) and its amendments," IEEE Press, Sep. 19, 2003, pp. 1-706, New York, NY, United States.

Stephens, A. et al., "Joint Proposal: High Throughput extension to the 802.11 Standard: MAC," IEEE P802.11, Wireless LANs: IEEE 802.11-05/1095r2, Nov. 16, 2005, pp. 1-37, United States.

Gesbert, D. et al., "Technologies and Performances for Non-Line-of-Sight Broadband Wireless Access Networks." IEEE Communications Magazine, Apr. 2002, pp. 86-95, United States.

Zheng, L. et al., "Diversity and Multiplexing: A Fundamental Tradeoff in Multiple-Antenna Channel," IEEE Transaction on Information Theory. vol. 49, No. 5, May 2003, pp. 1073-1096, United States.

Foschini, G.J., "Layered Space-Time Architecture for Wireless Communication in a Fading Environment When Using Multi-Element Antennas," Bell Labs Technical Journal, Autumn 1996, pp. 41-59, United States.

U.S. Non-final Office Action for U.S. Appl. No. 10/938,374 mailed Dec. 8, 2006.

U.S. Final Office Action for U.S. Appl. No. 10/938,374 mailed Jun. 1, 2007.

U.S. Non-final Office Action for U.S. Appl. No. 10/938,374 mailed Dec. 12, 2007.

U.S. Final Office Action for U.S. Appl. No. 10/938,374 mailed May 27, 2008.

U.S. Advisory Action for U.S. Appl. No. 10/938,374 mailed Sep. 6, 2007.

U.S. Advisory Action for U.S. Appl. No. 10/938,374 mailed Aug. 14, 2008.

U.S. Notice of Allowance for U.S. Appl. No. 10/938,374 mailed Jan. 30, 2009.

U.S. Notice of Allowance for U.S. Appl. No. 10/938,374 mailed Jul. 24, 2009.

U.S. Non-final Office Action for U.S. Appl. No. 11/800,123 mailed Mar. 2, 2010, USA.

U.S. Restriction Requirement for U.S. Appl. No. 11/800,123 mailed Oct. 5, 2009.

International Standard ISO/IEC 13818-2:2000, "Information Technology—Generic Coding of Moving Pictures and Associated Audio Information," Joint Technical Committee, ISO/IEC, Mar. 1, 2002, pp. 1-4, Switzerland.

* cited by examiner

METHOD AND SYSTEM FOR DATA PACKET COMMUNICATION IN WIRELESS COMMUNICATION SYSTEMS

FIELD OF THE INVENTION

The present invention relates to wireless communications and in particular, to requesting repeat of transmitted data in wireless communication systems.

BACKGROUND OF THE INVENTION

In many wireless communication systems, a frame structure is used for data transmission between wireless stations such as a transmitter and a receiver. For example, the IEEE 802.11 standard uses frame aggregation in a Media Access Control (MAC) layer and a physical (PHY) layer. In a typical transmitter, a MAC layer attaches a MAC header to a MAC Service Data Unit (MSDU), in order to construct a MAC Protocol Data Unit (MPDU). The MAC header includes information such as source addresses (SA) and a destination address (DA). The MPDU is a part of a PHY Service Data Unit (PSDU) and is transferred to a PHY layer in the transmitter to attach a PHY header thereto to construct a PHY Protocol Data Unit (PPDU) The PHY header includes parameters for determining a transmission scheme including a coding/modulation scheme. Before transmission as a packet from a transmitter to a receiver, a preamble is attached to the PPDU, wherein the preamble can include channel estimation and synchronization information.

According to the IEEE 802.11e specification, "Amendment: Medium Access Control (MAC) Quality of Service (QoS) Enhancements", (incorporated herein by reference), the QoS enabled stations (QSTAs) must maintain a transmit MSDU timer for each MSDU passed to the MAC layer. MSDU delivery ensures that the information in each MSDU is delivered between the MAC service access points.

A Management Information Base (MIB) attribute "dot11EDCATableMSDULifetime" in the MAC layer specifies the maximum amount of time allowed to transmit a MSDU for a given access category (AC). A transmit MSDU timer is started when the MSDU is passed to the MAC layer. If the value of this timer exceeds the appropriate entry in the "dot11EDCATableMSDULifetime" attribute, then the MSDU, or any remaining, undelivered fragments of that MSDU, are discarded by the source QSTA without any further attempt to complete delivery of that MSDU. Since the existing Automatic Repeat Request (ARQ) scheme simply relies on the "dot11EDCATableMSDULifetime" attribute, it is possible that the MSDU is discarded after a few retries. Discarding a MSDU can negatively impact the QoS for some applications such as video.

The QSTA in a wireless station obtains a transmission opportunity (TXOP), and forms a MSDU for transmission. If the current TXOP duration expires before the MSDU is successfully transmitted, then the QSTA re-contends the communication medium (channel) because the QSTA cannot utilize the channel longer than the TXOP duration. The overhead of successfully obtaining another TXOP is significant, and is typically the sum of the following periods: Inter-Frame Space (xIFS), backoff after a collision on a shared channel, Request To Send (RTS), and Clear To Send (CTS) control frames. As a result, the MSDU can expire before it is scheduled for retransmission.

Moreover, the IEEE 802.11 MAC protocol is contention based, and as such, it is difficult to predict when the QSTA will re-obtain the channel for transmission. FIG. 1 shows an example timing diagram scenario 10 wherein within a TXOP 20, a MSDU 30 is not successfully transmitted due to collision. As a result, since the QSTA cannot utilize the channel longer than the TXOP duration, the QSTA must re-contend the channel for another TXOP period.

FIG. 2 illustrates a timing diagram scenario 40 wherein the QSTA contends for the channel to obtain another TXOP 41 so that the MSDU blocks (packets) which could not be transmitted successfully in the previous TXOP 20 can be transmitted. A time period $T_{delay}$ 42 represents the delay from the last TXOP 20 until a remaining MSDU 30 can be sent. The $T_{delay}$ 42 depends on a time periods $T_{busy}$ 44, and a backoff interval 45 may be quite large. In this scenario, the remaining MSDUs expire before their transmission can be attempted again. After the QSTA re-obtains the channel, because the remaining MSDUs' transmit timers exceed the "dot11EDCATableMSDULifetime" attribute during the $T_{delay}$ period 42, the expired MSDUs are discarded. The existing ARQ scheme in the IEEE 802.11 standard does not provide further attempts at transmission of expired MSDUs in order to preserve and/or improve the quality of QoS for time-sensitive applications, negatively impacting QoS sensitive applications.

BRIEF SUMMARY OF THE INVENTION

The present invention provides a method and system for data packet communication in wireless communication systems. One embodiment involves determining if one or more data blocks pending transmission in a current transmission opportunity period over the channel will expire before the start of another transmission opportunity period, and if a data block will expire before the start of another transmission opportunity period, then extending the current transmission opportunity period by an extension period for transmitting the to be expiring data block during the extension period.

In one implementation, determining if one or more of the data blocks pending transmission in a current transmission opportunity period will expire, further includes if the current transmission opportunity period is of insufficient duration for transmission of one or more data blocks pending transmission in the current transmission opportunity period, then determining if one or more data blocks pending transmission in a current transmission opportunity period will expire before the start of another transmission opportunity period. One or more to be expiring packets are transmitted during the extension period.

These and other features, aspects and advantages of the present invention will become understood with reference to the following description, appended claims and accompanying figures.

BRIEF DESCRIPTION OF THE DRAWINGS

In the drawings, like reference symbols refer to similar elements.

DETAILED DESCRIPTION OF THE INVENTION

The present invention provides a method and system for data packet communication in wireless communication systems. One embodiment involves a transmission process for transmission of data packets in time-sensitive applications in wireless communication systems such as those with QoS criteria (for example, video data) in wireless networks. One implementation of the transmission process for QoS of time-sensitive applications in a wireless communication system is described below.

The wireless communication system includes a sender station (TX) and a receiver station (RX). The sender station is a QoS enabled station (QSTA) which successfully obtains a TXOP for access to a communication channel to transmit/retransmit MSDUs.

When the sender station detects one or more pending MSDUs in the current TXOP, such that the pending MSDUs have MSDU transmit timers that will expire before the start of the next TXOP, then the current TXOP is extended by an extension period to allow communication of such MSDUs. During the extension period, the MSDUs with such expiring MSDU transmit timers (i.e., time-sensitive pending MSDUs), are transmitted/retransmitted by the sender station.

Communication of the time-sensitive MSDUs over the channel during the extension period is on a best-effort basis. Preferably, communicating on a best-effort basis involves communicating the time-sensitive MSDUs from a transmitting station during the extension period without requiring an acknowledgement (ACK) or a block acknowledgment (BA) from a receiving station.

Figure 1:
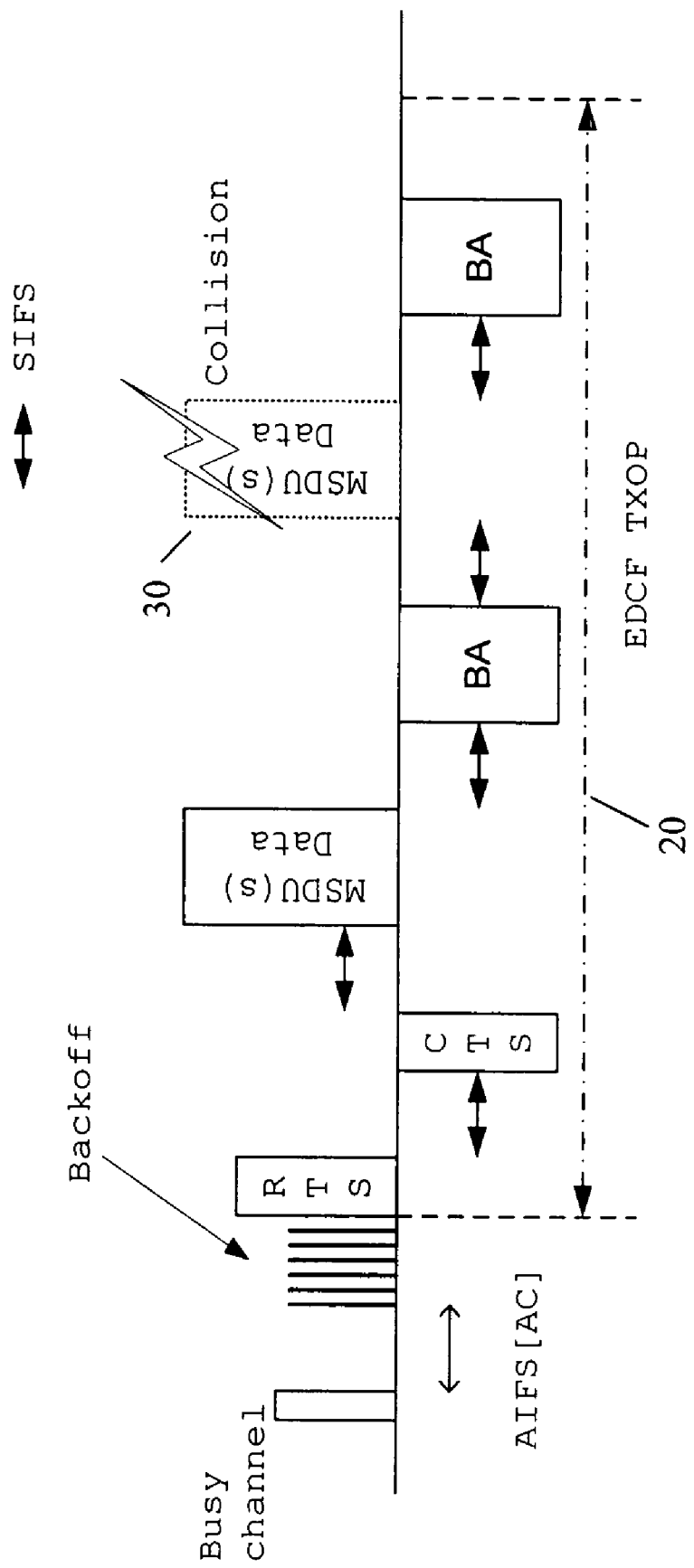
FIG. 1 shows a scenario wherein within a TXOP a few MSDUs are not successfully transmitted from a sender to a receiver in a conventional wireless communication system.
Figure 2:
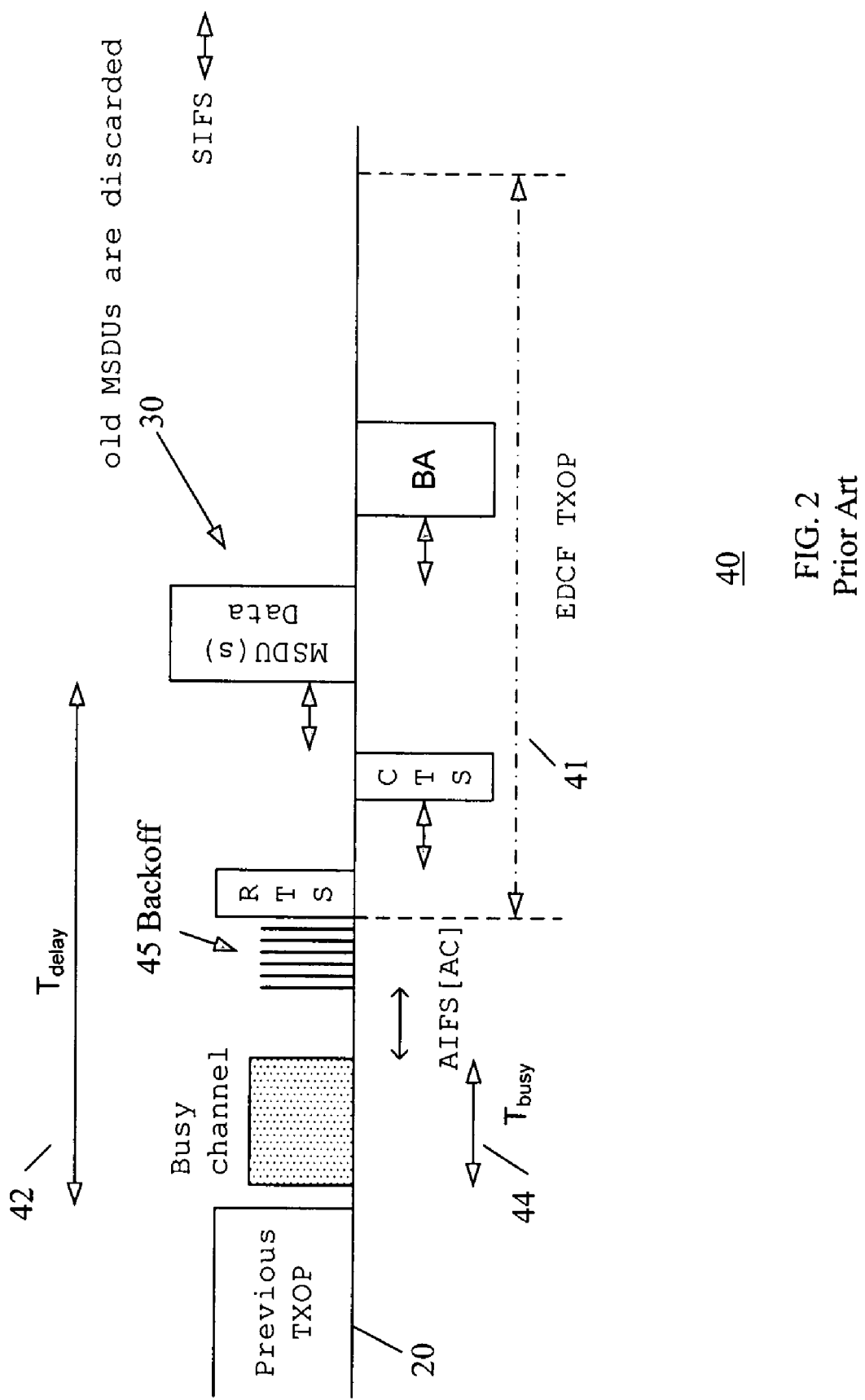
FIG. 2 illustrates a scenario wherein in a conventional wireless communication system, a sender contends for the communication channel to obtain another TXOP so that the MSDUs which could not be transmitted successfully in the previous TXOP can be retransmitted to a receiver.
Figure 3:
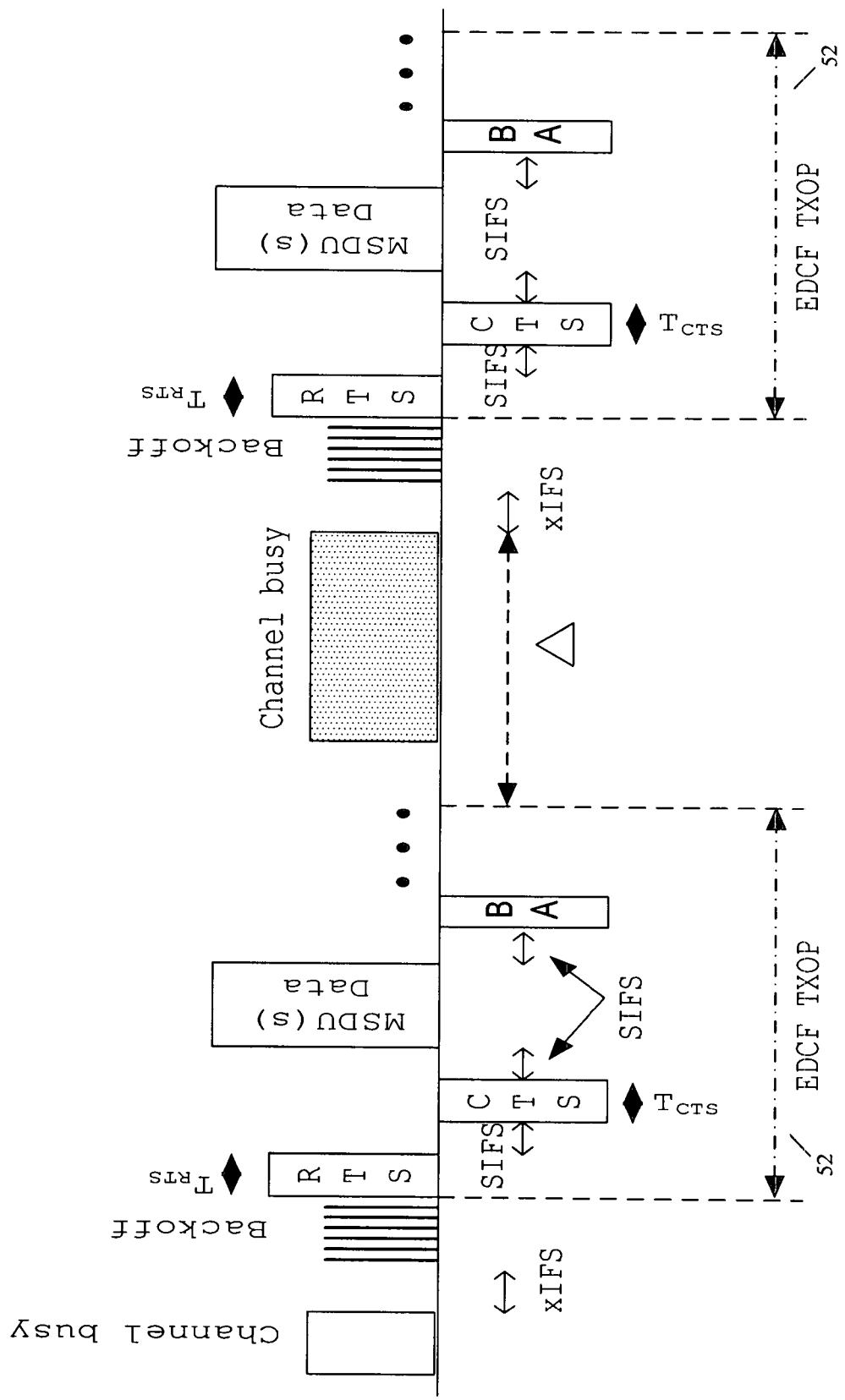
FIG. 3 shows a pseudo-timing diagram for a typical TXOP sequence.

In one example, certain indicative time periods are considered in determining if before the start of a next TXOP period (i.e., before a next TXOP can be obtained), the MSDU transmit timer for one or more MSDUs pending in the current TXOP will expire. Such indicative time periods include:

Time period T1=2×SIFS +$T_{CTS\text{-}to\text{-}self}$,

Time period T2=$MSDU_{expiry}$,

Time period T3=xIFS +2×SIFS +$Backoff_{avg}$ +$T_{RTS}$ $T_{CTS}$ +Δ, wherein the terms in the above definitions are described in Table 1 below. FIG. 3 illustrates a timing diagram 50 for a typical TXOP sequence 52.

TABLE 1

| Symbols | Details |
|---|---|
| $MSDU_{expiry}$ | MSDU expiry timer (dot11EDCATableMSDULifetime − (minus) actual time to transmit the MSDU) |
| xIFS | Distributed Coordination Function Inter Frame Space (DIFS) or Arbitration Inter-Frame Space (AIFS) (AIFS[AC]) duration |
| SIFS | Short interframe space duration |
| $Backoff_{avg}$ | Average backoff computed as a weighted average over previous n backoff values |
| $T_{RTS}$ | RTS frame transmission duration |
| $T_{CTS}$ | CTS frame transmission duration |
| $T_{CTS\text{-}to\text{-}self}$ | CTS-to-self frame transmission duration |
| Δ | Weighted average of delay observed between two consecutive TXOP sequences |

As indicated, one or more MSDUs may expire before the next TXOP can be started. In this embodiment, the time period T1 indicates the time required for the sender to obtain a TXOP, including: the sender waiting for a SIFS period, then sender sending a CTS-to-self during a period $T_{CTS\text{-}to\text{-}self}$, and then the sender waiting for another SIFS period before the transmission in the obtained TXOP can be started (i.e., T1=2× SIFS+$T_{CTS\text{-}to\text{-}self}$).

The time period T2 for a pending MSDU indicates the difference between the MSDU transmit timer (MSDU expiry timer) and the actual time to transmit the MSDU (i.e., $MSDU_{expiry}$ is the difference of MSDU expiry timer and the time to transmit the MSDU).

The time period T3 indicates the estimated delay in obtaining the next TXOP (e.g., as per the IEEE 802.11 protocol). This is an estimated time period before the next TXOP can be acquired (e.g., per the IEEE 802.11 protocol, the sender needs to backoff, as the actual delay is not known, and the sender uses an average Backoffavg, xIFS, sending an RTS frame ($T_{RTS}$) and receiving a CTS frame ($T_{CTS}$)). Such time periods are applicable only if the channel is free, therefore, a weighted average of delay observed between the end of the previous TXOP and the time the channel is free again, allowing for channel contention, i.e., when the next time the channel would be free is taken into account (Δ).

Based on the time periods T1, T2 and T3, it is determined if the inequality condition (1) below is true:

T1<T2<T3 (1)

wherein the inequity condition (1) indicates if by the start of the next TXOP period, the MSDU transmit timer for one or more MSDUs in the current TXOP will expire (i.e., to be expiring MSDUs).

If inequity condition (1) is true, then the MSDU transmit timer for one or more MSDUs in the current TXOP will expire by the start of the next TXOP period (i.e., expiring MSDUs), the current TXOP period is extended (lengthened) by acquiring another TXOP, wherein transmission of as many of the expiring MSDUs is allowed, according to an embodiment of the present invention.

Figure 4:
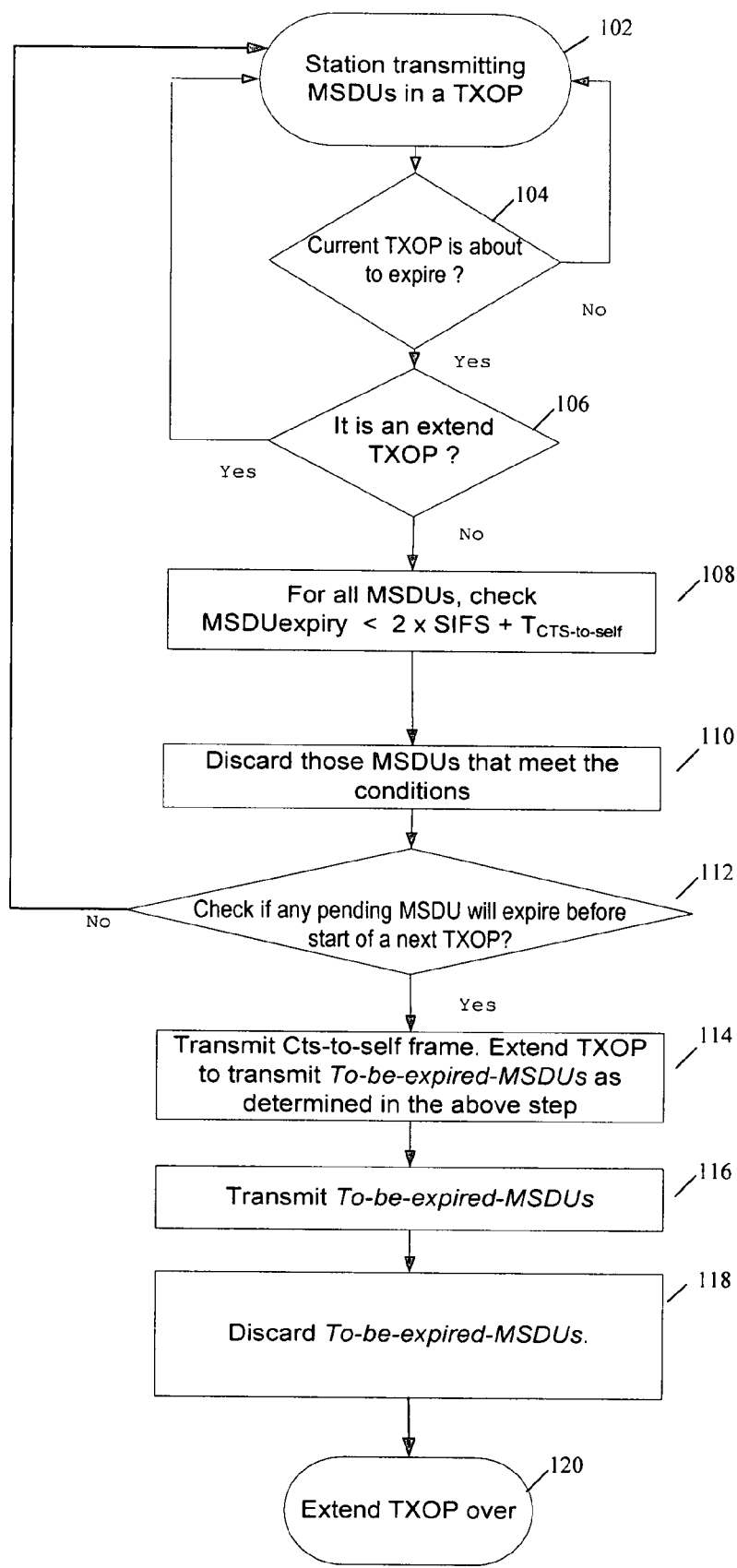
FIG. 4 shows a flowchart of the steps of a packet transmission process, according to an embodiment of the present invention.

FIG. 4 shows a flowchart of a packet transmission process 100 for an automatic repeat request (ARQ) by a QSTA sender, according to an embodiment of the present invention, including the following steps:

Step 102: QSTA sender station transmits MSDUs in a current TXOP.

Step 104: The QSTA station determines if the current TXOP is about to expire. If yes, then go to step 106, otherwise, go back to step 102.

Step 106: The QSTA station determines if the current TXOP is an extended TXOP. If yes, then go to step 102, otherwise, go to step 108.

Step 108: For all MSDUs pending in the current TXOP, the QSTA station checks which pending MSDUs expire before the next TXOP can be started (i.e., $MSDU_{expiry}$<2×SIFS+$T_{CTS\text{-}to\text{-}self}$), according to an embodiment of the current invention. This step determines which MSDUs would expire even if the next TXOP is obtained quickly (the sender needs at least $2 \times \text{SIFS} + T_{CTS\text{-}to\text{-}self}$ duration to obtain a next TXOP) Such MSDUs, if any, are discarded in step 110 below.

Step 110: The QSTA station discards those pending MSDUs for which $\text{MSDU}_{expiry} < 2 \times \text{SIFS} + T_{CTS\text{-}to\text{-}self}$ (i.e., MSDUs that will expire even if the next TXOP is obtained without delay within $2 \times \text{SIFS} + T_{CTS\text{-}to\text{-}self}$ duration, are discarded).

Step 112: For all remaining MSDUs pending transmission in the current TXOP, the QSTA station determines if any of the pending MSDUs have lifetime timers (i.e., MSDU transmit timers) that satisfy condition (1) above, indicating that before the start of a next TXOP period the MSDU transmit timer for a MSDU pending in the current TXOP will expire. If not go back to step 102, otherwise, mark such MSDUs as To-be-expired-MSDUs and go to step 114 (i.e., such MSDUs are identified as time-sensitive and will expire while waiting for routine TXOP grant; therefore in step 114, the current TXOP is extended for transmission of such time-sensitive MSDUs).

Step 114: Transmit a CTS-To-Self frame to extend the TXOP duration of the current TXOP sequence for transmitting the To-be-expired-MSDUs on a best-effort basis.

Step 116: Transmit the To-be-expired-MSDUs on a best-effort basis in the extended TXOP duration for the current MSDU sequence.

Step 118: Discard the To-be-expired-MSDUs after the transmission on a best-effort basis.

Step 120: The extended TXOP sequence is over. Proceed to the next TXOP sequence.

In step 116, since the To-be-expired-MSDUs are transmitted on a best-effort basis, no acknowledgement is requested (the sender does not wait for an Ack for the To-be-expired-MSDUs from the sender). As such a BA duration is not included in the extended TXOP period when transmitting the To-be-expired-MSDUs.

The transmission rate for the To-be-expired-MSDUs in the extended TXOP period can be, for example:
i. Same transmission rate as used in the immediate previous TXOP sequence, or
ii. Reduced transmission rate (relative to an immediate previous TXOP sequence) to transmit To-be-expired-MSDUs more reliably.

Figure 5:
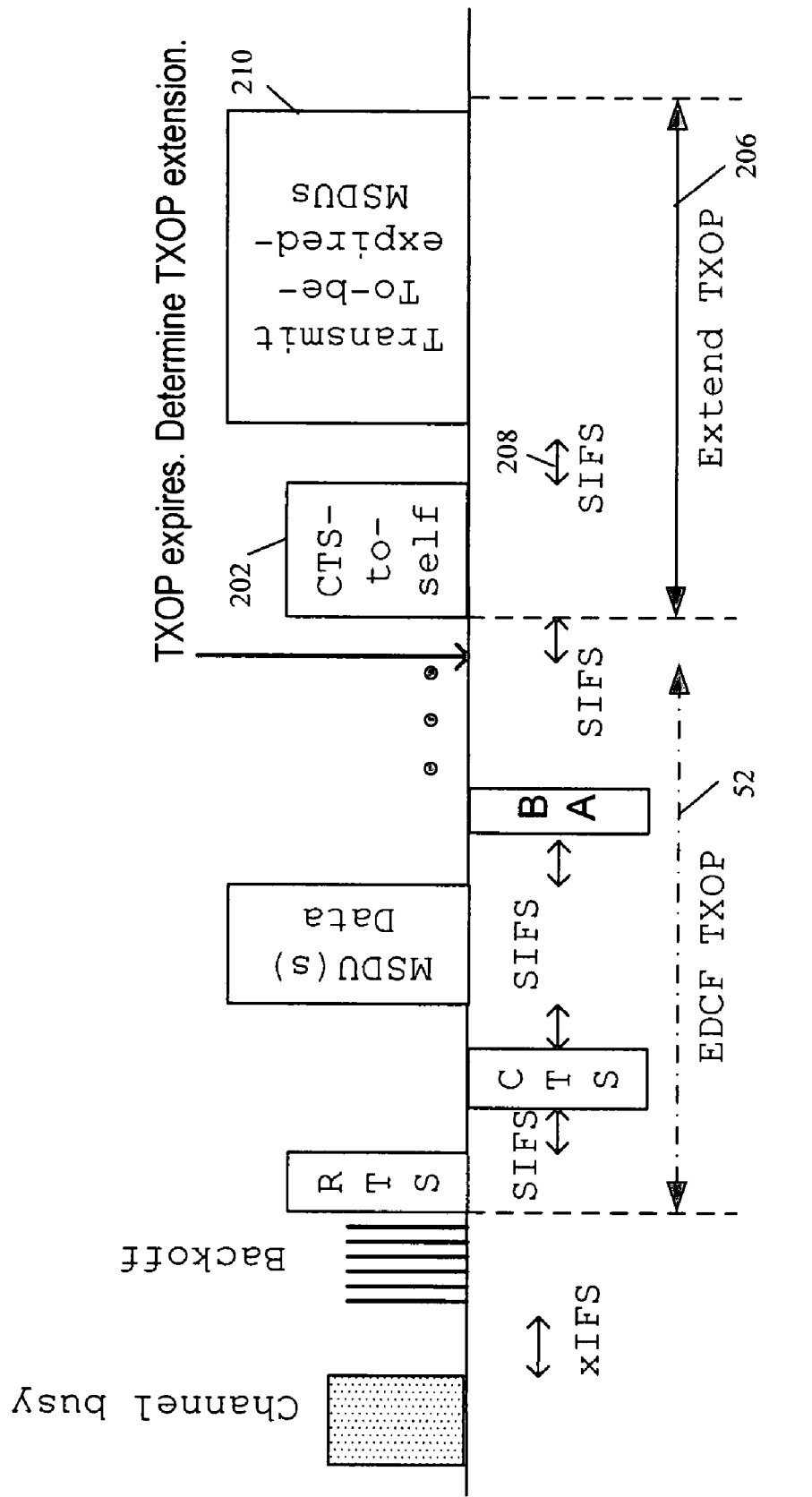
FIG. 5 diagrammatically illustrates a pseudo-timing diagram for extending TXOP duration for a packet transmission process, according to an embodiment of the present invention.

FIG. 5 diagrammatically illustrates an example pseudo-timing diagram 200 for extending a current TXOP duration using the packet transmission process 100 described above. A current TXOP sequence duration (e.g., a TXOP sequence 52 of FIG. 3) is extended when the sender (QSTA) determines that the current TXOP period requires an extension for transmitting pending MSDUs with lifetime timers that satisfy condition (1) above (i.e., determines the To-be-expired-MSDUs). In that case, the sender transmits a CTS-to-self frame 202 (FIG. 5) to extend the current TXOP duration 52 by an extension period 206.

During the extended TXOP period 206, subsequent to the CTS-to-self frame 202, and after passage of a SIFS interval 208, the sender transmits the To-be-expired-MSDUs 210 to the receiver on a best-effort basis. A best-effort basis dispenses with requiring a BA or ACK from the receiver upon receiving each To-be-expired-MSDU. The sender then discards the transmitted MSDUs, and the extended TXOP period 206 is complete.

Figure 6:
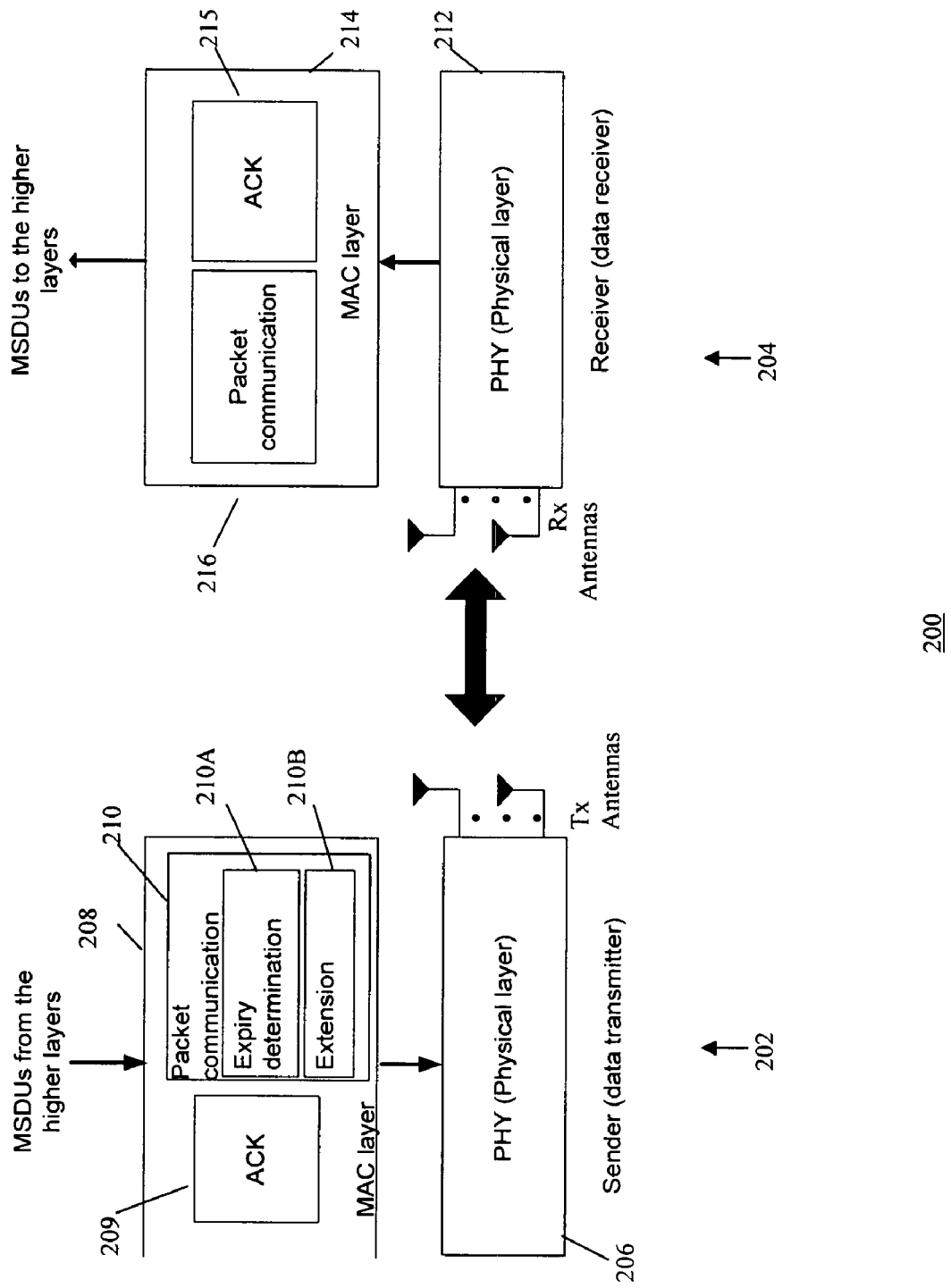
FIG. 6 shows a functional block diagram of an example wireless communication system implementing a packet transmission, according to an embodiment of the present invention.

FIG. 6 shows a functional block diagram of an example wireless system 200 implementing the above packet transmission process, such as in an IEEE 802.11 wireless network, according to an embodiment of the present invention. The system 200 includes a wireless station 202 and a wireless station 204. In one communication scenario, the station 202 can function as a sender and the station 204 can function as a wireless receiver.

The sender 202 includes a PHY layer 206 and a MAC layer 208. The MAC layer 208 implements an acknowledgment module such as a block ACK (BA) module, and a packet transmission module 210. The packet communication module 210 implements the packet transmission process 100 above. Specifically, an expiry determination module 210A determines packet expiration by implementing the steps 102 through 112 of the process in FIG. 4, and an extension module 210B performs TXOP extension by implementing the steps 114 through 120 of the process 100 in FIG. 4.

The receiver 204 includes a PHY layer 212 and a MAC layer 214. The MAC layer 214 may include an acknowledgment module 215 and a packet communication module 216. The PHY layers 206, 212, implement the IEEE 802.11 standard. Each PHY layer 206, 212, may comprise one or multiple antennas. The MAC layers 208, 214, comprise several modules, however, in FIG. 6, only the modules 209, 210, 215, 216 are shown. The sender packet communication module 210 implements the packet transmission process 100. The modules 209, 215, implement the IEEE 802.11 acknowledgement scheme.

The packet transmission module 210 triggers a TXOP extension before the expiry of the MSDU transmit timer for MSDUs pending in a current TXOP. Instead of simply discarding the expiring MSDU(s), the module 210 retries transmitting the expiring MSDU(s) to the station 204 by obtaining a TXOP extension, before discarding the MSDU(s). This provides improved QoS. In another communication scenario, the station 204 can function as a sender and the station 202 can function as a wireless receiver. In that case, the packet communication module 216 implements the packet transmission process 100.

If all stations in a wireless network utilize an ARQ process according to the present invention, then communication channel contention may be reduced, and hence, overall fairness for transmission may be improved.

As is known to those skilled in the art, the aforementioned example architectures described above, according to the present invention, can be implemented in many ways, such as program instructions for execution by a processor, as logic circuits, as an application specific integrated circuit, as firmware, etc. The present invention has been described in considerable detail with reference to certain preferred versions thereof; however, other versions are possible. Therefore, the spirit and scope of the appended claims should not be limited to the description of the preferred versions contained herein.

What is claimed is:

1. A method of wireless communication over a channel, comprising:
    determining if one or more data blocks pending transmission in a current transmission opportunity period over the channel will expire before the start of another transmission opportunity period by determining if for a pending Media Access Control Service Data Unit (MSDU) block, an expiry time representing the difference between a MSDU expiry timer and the time to transmit the MSDU, is greater than the time required for obtaining another transmission opportunity period, wherein the time required for obtaining another transmission opportunity period includes time durations for: the sender waiting for a short interframe space duration period, then the sender sending a clear-to-send message to self (CTS-to-self), and then the sender waiting for another interframe space duration period before transmission in the obtained transmission opportunity period can begin; and if a data block will expire before the start of another transmission opportunity period, then extending the current transmission opportunity period by an extension period for transmitting the expiring data block during the extension period at a same data rate or at a reduced data rate, as that of an immediate previous transmission opportunity period.

2. The method of claim 1 wherein determining if one or more of the data blocks pending transmission in a current transmission opportunity period will expire, further includes:

if the current transmission opportunity period is of insufficient duration for transmission of one or more data blocks pending transmission in the current transmission opportunity period, then determining if one or more data blocks pending transmission in a current transmission opportunity period will expire before the start of another transmission opportunity period.

3. The method of claim 2 further including transmitting said expiring data block during the extension period on a best-effort basis without requiring receipt acknowledgement.

4. The method of claim 3 wherein the wireless communication system implements an IEEE 802.11 type communication protocol.

5. The method of claim 4 wherein the data blocks comprise MSDU blocks.

6. The method of claim 5 wherein determining if one or more data blocks pending transmission in a current transmission opportunity period will expire before the start of another transmission opportunity period, further includes:

determining if expiry time of the pending MSDU block in the current opportunity period is smaller than an estimated delay in starting said other transmission opportunity period.

7. The method of claim 6 wherein the estimated delay comprises a combination of time durations for: a Distributed Coordination Function Inter Frame Space period, a short interframe space period, another interframe space period before transmission in the obtained transmission opportunity period can begin, an average backoff period computed as a weighted average over previous n backoff values, a Request To Send transmission period, a Clear To Send transmission period, and a weighted average of delay observed from the end of the previous transmission opportunity period to the time the channel is free again allowing for channel contention.

8. The method of claim 5 further including discarding those pending MSDU blocks for which the expiry time is smaller than the time required to start another transmission opportunity period.

9. The method of claim 5 wherein extending the current transmission opportunity period includes transmitting a CTS-to-self frame to extend the duration of the current transmission opportunity period.

10. A wireless station, comprising:
a processor, the processor executes:
an expiry determination module configured for determining if one or more data blocks pending transmission in a current transmission opportunity period over the channel will expire before the start of another transmission opportunity period by determining if for a pending Media Access Control Service Data Unit (MSDU) block, an expiry time representing the difference between a MSDU expiry timer and the time to transmit the MSDU, is greater than the time required for obtaining another transmission opportunity period, wherein the time required for obtaining another transmission opportunity period includes time durations for: the sender waiting for a short interframe space duration period, then the sender sending a clear-to-send message to self (CTS-to-self), and then the sender waiting for another interframe space duration period before transmission in the obtained transmission opportunity period can begin;

an extension module configured such that if a data block will expire before the start of another transmission opportunity period, the extension module extends the current transmission opportunity period by an extension period for transmitting the expiring data block during the extension period; and a communication module is configured for transmitting an expiring data block during the extension period at a same data rate or a reduced data rate, as that of an immediate previous transmission opportunity period.

11. The wireless station of claim 10 wherein the expiry determination module is further configured for determining if one or more of the data blocks pending transmission in a current transmission opportunity period will expire, by determining if the current transmission opportunity period is of insufficient duration for transmission of one or more data blocks pending transmission in the current transmission opportunity period, and then determining if one or more data blocks pending transmission in a current transmission opportunity period will expire before the start of another transmission opportunity period.

12. The wireless station of claim 11 wherein the communication module is further configured for transmitting said expiring data block during the extension period on a best-effort basis without requiring receipt acknowledgement.

13. The wireless station of claim 12 wherein the wireless station implements an IEEE 802.11 type communication protocol.

14. The wireless station of claim 13 wherein the data blocks comprise MSDU blocks.

15. The wireless station of claim 14 wherein the expiry determination module is further configured for determining if one or more data blocks pending transmission in a current transmission opportunity period will expire before the start of another transmission opportunity period, further includes:

determining if expiry time of the pending MSDU block in the current opportunity period is greater than the time required to start another transmission opportunity period, and if so, then determining if the time required to start another transmission opportunity period is before an estimated delay in staring said other transmission opportunity period.

16. The wireless station of claim 15 wherein the expiry determination module is further configured for determining if the time required to start another transmission opportunity period is less than the estimated delay in staring said other transmission opportunity period, wherein the estimated delay comprises a combination of time durations for: a Distributed Coordination Function Inter Frame Space period, a short interframe space period, another interframe space period before transmission in the obtained transmission opportunity period can begin, an average backoff period computed as a weighted average over previous n backoff values, a Request To Send transmission period, a Clear To Send transmission period, and a weighted average of delay observed from the end of the previous transmission opportunity period to the time the channel is free again allowing for channel contention.

17. The wireless station of claim 14 wherein the expiry determination module is further configured for discarding those pending MSDU blocks for which the expiry time is smaller than the time required to start another transmission opportunity period.

18. The wireless station of claim 14 wherein the extension module is further configured for extending the current transmission opportunity period by transmitting a CTS-to-self frame to extend the duration of the current transmission opportunity period.

* * * * *